Nov. 18, 1958     J. JOHNSON     2,860,644
COMBINE BEATER CYLINDER
Filed April 30, 1957
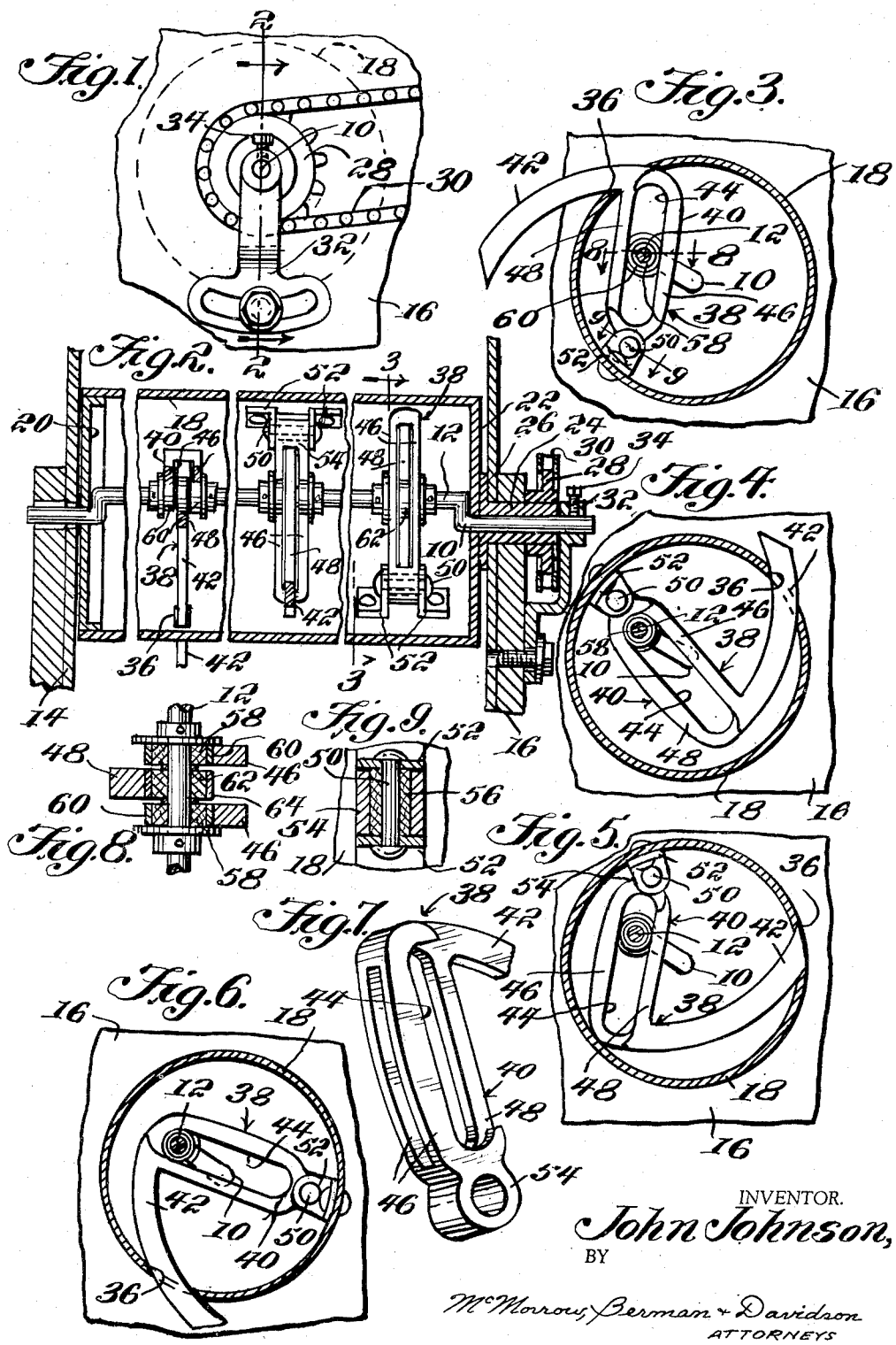
INVENTOR.
John Johnson,
BY
McMorrow, Berman & Davidson
ATTORNEYS

United States Patent Office 2,860,644
Patented Nov. 18, 1958

2,860,644

COMBINE BEATER CYLINDER

John Johnson, Brockton, Mont.

Application April 30, 1957, Serial No. 656,113

4 Claims. (Cl. 130—22)

The present invention relates to a beater cylinder for a combine.

An object of the present invention is to provide a beater cylinder for a combine which lends itself to long life, one which obviates wearing of the fingers or the adjacent walls of the slots in the cylinder through which the fingers are alternatingly projected and retracted, and one which is virtually noiseless in operation.

Another object of the present invention is to provide a beater cylinder for a combine which is simple in structure, one sturdy in construction, one requiring little or no lubrication through its long life, and one which is highly efficient in action.

These and other objects and advantages of the present invention will be fully apparent from the following description when taken in connection with the annexed drawing, in which:

Figure 1 is an end elevational view of the beater cylinder according to the present invention showing the drive means therefor;

Figure 2 is a sectional view taken on the line 2—2 of Fig. 1;

Figure 3 is a sectional view taken on the line 3—3 of Figure 2, showing one of the fingers in its projected position;

Figure 4 is a view similar to Figure 3, showing the finger partially retracted;

Figure 5 is a view similar to Figures 3 and 4, showing the finger fully retracted;

Figure 6 is a view similar to Figures 3 to 5, inclusive, showing the finger at the start of its movement toward the projected position;

Figure 7 is an enlarged isometric view of the beater finger according to the present invention;

Figure 8 is a sectional view, on an enlarged scale, taken on the line 8—8 of Figure 3; and Figure 9 is a sectional view, on an enlarged scale, taken on the line 9—9 of Figure 3.

Referring in greater detail to the drawing in which like numerals indicate like parts throughout the several views, the beater finger according to the present invention comprises a fixed crankshaft 10 having a throw 12 intermediate the ends thereof. The crankshaft 10 is mounted in a combine between a pair of frame members 14 and 16, as shown in Figure 2. A hollow cylinder 18, having closed ends 20 and 22, encompasses the throw 12 of the crankshaft 10. A hole is provided in the closed end 20 of the cylinder 18 and an adjacent portion of the crankshaft 10 projects through the hole and supports the cylinder 18 on that end of the crankshaft 10 for rotation thereabouts. A bushing 24, having a flange 26 on one end thereof, is mounted in the frame member 16 and has a flange 26 fixedly secured to the closed end 22 of the cylinder 18.

The bushing 24 carries on its end remote from the flange 26 a sprocket wheel 28. A drive chain 30 connects the sprocket wheel 28 to a source of rotative power in the combine. The adjacent end portion of the shaft 10 extends through the bushing 24 and has its free end projecting exteriorly of the sprocket wheel 28. An arm 32, secured by bolts 34, is carried upon the projecting end portion of the shaft 10 adjacent the sprocket wheel 28 and has its free end adjustably connected to the frame member 16 for limited swinging movement.

The cylinder 18 is provided with a plurality of slots 36 arranged in staggered spaced relation therealong. A plurality of beater fingers, designated generally by the reference numeral 38, are positioned within the cylinder 18. Each beater finger 38 has a rigid arm 40 and an arcuate finger 42 projecting at substantially a right angle from one end of the arm 40. The beater fingers 38 are positioned within the cylinder 18 so that the fingers 42 are transversely of the throw 12 of the shaft 10 and with the free end of each of the fingers 42 in registry with one of the slots 36 in the cylinder 18.

Each of the arms 40 has a longitudinally extending closed slot 44 slidably embracing the adjacent portion of the throw 12 of the crankshaft 10. As shown most clearly in Figure 7, the arm 40 of each of the beater fingers 38, is fabricated of two longitudinally extending parallel bars on one side thereof and a single bar on the other side thereof, the double bars being designated by the reference numeral 46 and the single bar by the reference numeral 48.

Means is provided perpendicularly connecting the end of each of the arms 40 remote from the finger 42 to the inner wall of the cylinder 18. Specifically, this means includes a pivot pin 50 arranged longitudinally of the cylinder 18 adjacent each of the slots 36 in the cylinder 18. Each pivot pin 15 is mounted in a pair of trunnions 52 which are beveled to the inner wall of the cylinder 18. A sleeve 54 is carried by each arm 40 upon the end thereof remote from the associated finger 42. The sleeve 54 of each beater finger 38 is mounted upon the adjacent pivot pin 50 for swinging movement of the arm 40 about the pivot pin 50 as an axis.

An important feature of the beater fingers 38 is that the sleeve 54 of each beater finger 38 is mounted upon a hardwood bearing 56 requiring little or no lubrication after installation. Another feature of the invention rests in the provision of hardwood bearing collars 58 (Fig. 8) each having a metal band 60 thereabout and serving as a roller on the throw 12 of the crankshaft 10 engaged by the adjacent one of the bars 46 of the beater finger 38. Another hardwood collar 62, similarly encompassed by a metal band 64, serves as a roller for the bar 48 of the arm 40. The collar 62 is also mounted upon the throw 12 for rotation thereabout. It will be seen that the provision of the collars 58 and 62 permit the sliding movement of the throw 12 in the slot 44 provided in the arm 40 without any friction other than the rotational friction of the collars 58 and 62 upon the throw 12.

The pivotal connection of each beater finger 38 to the inner wall of the cylinder 18 results in the swinging movement of the arm 40 of the beater finger 38 toward and away from the adjacent one of the slots 36 provided in the cylinder 18. This swinging movement is responsive to rotation of the cylinder 18 about the crankshaft 10 as an axis. It will be seen, therefore, that each of the fingers 42 of each beater finger 38 projects and retracts through the adjacent slot 36 without rubbing or wearing on the edges of the slots. This results in long life for the beater finger of the present invention without wearing of either of the fingers 42 or the walls of the slots 36.

Adjustment of the lower end of the arm 32 on the frame member 16 enables the user to position the throw 12 of the crankshaft 10 at any selected position to vary the point at which the fingers 42 project from the cylinder 18.

The cylinder of the present invention may be employed as either a feeder to the threshing cylinder or for feeding material away from the threshing cylinder to the straw rack.

What is claimed is:

1. A rotary beater for a combine comprising a fixed crankshaft having a throw intermediate the ends thereof, a hollow closed ended cylinder encompassing the throw of said crankshaft and having its ends rotatably mounted upon the ends of said crankshaft, there being a plurality of slots in said cylinder arranged in staggered spaced relation therealong, a plurality of beater fingers each having a rigid arm and a finger projecting from one end of said arm positioned within said cylinder so that the fingers are transversely of the throw of said crankshaft with the free end of each finger being in registry with a slot of said cylinder, each of said arms having a longitudinally extending closed slot therein slidably embracing the adjacent portion of the throw of said crankshaft, and means pivotally connecting the other end of each of said arms to the inner wall of said cylinder, each of said fingers being alternatingly projected and retracted through the associated cylinder slot responsive to the rotation of said cylinder.

2. A rotary beater for a combine comprising a fixed crankshaft having a throw intermediate the ends thereof, a hollow closed ended cylinder encompassing the throw of said crankshaft and having its ends rotatably mounted upon the ends of said crankshaft, there being a plurality of slots in said cylinder arranged in staggered spaced relation therealong, a plurality of beater fingers each having a rigid arm and an arcuate finger projecting from one end of said arm positioned within said cylinder so that the fingers are transversely of the throw of said crankshaft with the free end of each finger being in registry with a slot of said cylinder, each of said arms having a longitudinally extending closed slot therein slidably embracing the adjacent portion of the throw of said crankshaft, and means pivotally connecting the other end of each of said arms to the inner wall of said cylinder, each of said fingers being alternatingly projected and retracted through the associated cylinder slot responsive to rotation of said cylinder.

3. A rotary beater for a combine comprising a fixed crankshaft having a throw intermediate the ends thereof, a hollow closed ended cylinder encompassing the throw of said crankshaft and having its ends rotatably mounted upon the ends of said crankshaft, there being a plurality of slots in said cylinder arranged in staggered spaced relation therealong, a plurality of beater fingers each having a rigid arm and a finger projecting from one end of said arm positioned within said cylinder so that the fingers are transversely of the throw of said crankshaft with the free end of each finger being in registry with a slot of said cylinder, each of said arms having a longitudinally extending closed slot therein slidably embracing the adjacent portion of the throw of said crankshaft, a pivot pin arranged longitudinally of said cylinder adjacent each of said cylinder slots and fixedly secured to the inner wall of said cylinder, and a sleeve carried by the other end of each of said arms and mounted upon the adjacent pivot pin for swinging movement of said arm about said pivot pin as an axis, each of said fingers being alternatingly projected and retracted through the associated cylinder slot responsive to rotation of said cylinder.

4. A rotary beater for a combine comprising a fixed crankshaft having a throw intermediate the ends thereof, a hollow closed ended cylinder encompassing the throw of said crankshaft and having its ends rotatably mounted upon the ends of said crankshaft, there being a plurality of slots in said cylinder arranged in staggered spaced relation therealong, a plurality of beater fingers each having a rigid arm and a finger projecting from one end of said arm positioned within said cylinder so that the fingers are transversely of the throw of said crankshaft with the free end of each finger being in registry with a slot of said cylinder, each of said arms having a longitudinally extending closed slot therein slidably embracing a plurality of rollers freely rotatable about the adjacent portion of the throw of said crankshaft, and means pivotally connecting the other end of each of said arms to the inner wall of said cylinder, each of said fingers being alternatingly projected and retracted through the associated cylinder slot responsive to the rotation of said cylinder.

References Cited in the file of this patent

UNITED STATES PATENTS

| 69,045 | Terrell | Sept. 17, 1867 |
| 2,557,226 | Johnson | June 19, 1951 |
| 2,562,659 | Carter et al. | July 31, 1951 |